US012560194B2

(12) United States Patent
Tulloch

(10) Patent No.: US 12,560,194 B2
(45) Date of Patent: Feb. 24, 2026

(54) WASHER DEVICE

(71) Applicant: AIRBUS OPERATIONS LIMITED, Bristol (GB)

(72) Inventor: William Tulloch, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 117 days.

(21) Appl. No.: 18/128,156

(22) Filed: Mar. 29, 2023

(65) Prior Publication Data

US 2023/0313830 A1      Oct. 5, 2023

(30) Foreign Application Priority Data

Mar. 30, 2022      (GB) ...................................... 2204582

(51) Int. Cl.
F16B 43/00        (2006.01)
B64F 5/10         (2017.01)

(52) U.S. Cl.
CPC .............. F16B 43/009 (2013.01); B64F 5/10 (2017.01)

(58) Field of Classification Search
CPC ....... F16B 5/0233; F16B 43/009; F15B 5/025
USPC ......................................... 411/546, 535, 536
See application file for complete search history.

(56) References Cited

U.S. PATENT DOCUMENTS 1,966,780 A  *  7/1934  Wynrick ............. F16H 25/2006
                                                 411/536
3,285,568 A  *  11/1966  Biach .................... F16B 43/007
                                                 416/207

4,197,031 A  *  4/1980  Hild .................... E02D 29/1409
                                                 404/26
4,256,211 A  *  3/1981  Katkov ................. F16D 25/126
                                                 192/111.1
4,433,879 A  *  2/1984  Morris .................. F16B 5/0642
                                                 411/535
5,522,688 A  *  6/1996  Reh ......................... F16B 31/04
                                                 411/536

(Continued)

FOREIGN PATENT DOCUMENTS

DE          40 22 299           1/1992
DE          196 42 446 C2       6/2000

(Continued)

OTHER PUBLICATIONS

Extended European Search Report for Application No. EP 23 164635. 7, eight pages, dated Jul. 20, 2023.

(Continued)

*Primary Examiner* — Flemming Saether
(74) *Attorney, Agent, or Firm* — Nixon & Vanderhye, PC

(57) ABSTRACT

A washer device is disclosed including two annular components each having a main face arranged to contact the main face of the other component. Each main face has surface regions of different levels along an axis of the component, such as a step and/or a helical ramp. Relative rotation of one component with respect to the other about their common axis alters the effective thickness of the washer device. The washer device 1 further includes at least one radial projection on one of the annular components arranged to engage with a corresponding notch on the other annular component such that the annular components may be oriented in predetermined angular positions corresponding to different predetermined effective thicknesses of the washer device.

14 Claims, 5 Drawing Sheets

(56)                     References Cited

U.S. PATENT DOCUMENTS

| | | | | |
|---|---|---|---|---|
| 5,895,189 | A | 4/1999 | Rückert | |
| 6,524,026 | B2 * | 2/2003 | Sondrup | E02D 29/1409 |
| | | | | 404/26 |
| 6,666,615 | B2 * | 12/2003 | Mukouyama | F16B 43/009 |
| | | | | 403/374.1 |
| 8,202,033 | B2 * | 6/2012 | Choi | B62D 27/065 |
| | | | | 411/546 |
| 10,407,914 | B2 * | 9/2019 | Seo | E04F 11/1041 |
| 2007/0009342 | A1 * | 1/2007 | Figge | F16B 5/025 |
| | | | | 411/546 |
| 2011/0318140 | A1 | 12/2011 | Chang | |
| 2019/0003186 | A1 | 1/2019 | Seo | |
| 2019/0257350 | A1 | 8/2019 | Hess et al. | |
| 2024/0240666 | A1 * | 7/2024 | Adams | F16B 43/009 |

FOREIGN PATENT DOCUMENTS

| | | |
|---|---|---|
| EP | 2 667 042 | 11/2013 |
| EP | 3 385 551 | 10/2018 |
| GB | 812789 | 4/1959 |
| GB | 2531959 | 5/2016 |
| GB | 2553548 | 3/2018 |

OTHER PUBLICATIONS

Combined Search and Examination Report, dated Apr. 19, 2022, for GB2204582.7, 9 pages.
Communication for EP Application No. 23 164 635.7, four pages, dated Jul. 31, 2025.

* cited by examiner

WASHER DEVICE

CROSS RELATED APPLICATION

This application claims priority to United Kingdom Patent Application GB 2204582.7, filed Mar. 30, 2022, the entire contents of which is hereby incorporated by reference.

FIELD OF TECHNOLOGY

This invention relates to a washer device. The invention further relates to: a method of assembling an aircraft component assembly using such a washer device; an aircraft component assembly including such a washer device; and an aircraft including such a washer device.

BACKGROUND

It is desirable to be able to build aircraft in a reduced time frame. One means of achieving this is to make pre-assembled modules of equipment that can be attached together, preferably in an automated operation, rather than the conventional assembly method of assembling equipment manually piece by piece.

Assembly of equipment components can be adversely affected by tolerances, that is, dimensional differences between components that may result in gaps at fastening points. They cannot always be eliminated, but only allowed for in the assembled device. Tolerances can also "stack" when more than two components are joined at a particular location, creating a significant dimensional deviation or gap. Tolerances may be very small, fractions of a millimetre, or very large, up to several millimetres, depending upon the circumstances. It will be appreciated that a module of many components may have a large tolerance stack.

Attempts have been made in the prior art to eliminate tolerances, or else to compensate for them in an assembled device. These generally comprise shims, packing pieces or washers that fill the gap between the mating surfaces of the components to be joined. Washers are generally used to compensate for tolerances in fastener assemblies. It may be necessary to use washers of different thicknesses, or several washers, in order to compensate for a tolerance stack in a module of components. Selecting and installing the correct thickness of washer is time consuming.

It is known to provide washers that are adjustable in effective thickness (or effective height): for example, GB812789 discloses a washer device comprising two annular components having engaging faces formed by helical ramps. Relative rotation of one component relative to the other causes a change in the effective thickness of the washer. However, the washer components then have to be retained in a desired position by means of locking pins, further adding complexity and time to the assembly process.

GB2553548 proposes to solve this problem by means of a washer device formed of two annular components each having engaging faces formed by steps of different heights. Some of the steps of one annular piece have a protuberance that can engage with corresponding recesses formed in the other annular piece, thereby retaining the components in a desired position. However, the components are complex to manufacture to accuracy, and are difficult for an operator to manipulate and align correctly. Furthermore, such a washer device has insufficient mechanical strength for aircraft applications because of its small bearing surfaces.

BRIEF SUMMARY OF THE TECHNOLOGY

The invention provides a washer device comprising two annular components, each having a main face arranged to contact the main face of the other component, each main face having surface regions of different levels along an axis of the component, whereby relative rotation of one component with respect to the other about their common axis alters the effective thickness of the washer device; and further comprising at least one radial projection extending from one of the annular components and arranged to engage with at least one corresponding notch or recess on the other annular component such that the annular components may be oriented in predetermined angular positions corresponding to different predetermined effective thicknesses of the washer device. The provision of a co-operating radial projection and notch reduces or even prevents relative rotational movement and radial movement of the components, and so permits the washer device to be set to a desired effective thickness with greater certainty and stability than was achievable hitherto.

Preferably, the surface regions of different levels of each main face are formed by at least one step. Alternatively, or in addition, the surface regions of different levels of each main face are formed by at least one ramp.

Advantageously, one component is arranged to sit within a recess in the other components, so that one component is nested in the other, the components having a coaxial central aperture.

The washer device preferably comprises a plurality of notches on one component with which the radial projection of the other component can engage.

Alternatively, the washer device comprises a plurality of radial projections on one component arranged to engage with the at least one notch of the other component.

As a further alternative, a plurality of radial projections are provided on one component, arranged to engage with respective ones of a plurality of notches on the other component. Such an arrangement stabilizes the washer device.

At least one of the components may include permanently magnetic material. This assists a user in bringing the components together into an assembled position and also holds them in that position, particularly if the washer device is used in a non-horizontal assembly.

Optionally, visual indicators are provided on at least one of the components in order to indicate to a user the effective thickness of the washer device when the components are in different respective relative positions.

The invention further provides an aircraft component assembly including a washer device constructed according to the first aspect of the invention.

The aircraft component assembly preferably includes a fastener extending coaxially through the washer device.

The invention further provides an aircraft including a washer device constructed according to the first aspect of the invention, or an aircraft component assembly according to the second aspect of the invention.

The invention further provides a method of assembling aircraft components comprising the step of adjusting the effective thickness of a washer device constructed according to the first aspect of the invention.

Preferably, the step of adjusting the effective thickness of the washer device further comprises the steps of separating axially the components of the washer device, rotating one component with respect to the other about the axis and then axially bringing the components together.

BRIEF DESCRIPTION OF THE DRAWINGS

The invention will now be described, by way of example, with reference to the accompanying drawings in which.

DETAILED DESCRIPTION OF EMBODIMENTS OF THE TECHNOLOGY

Figure 1:
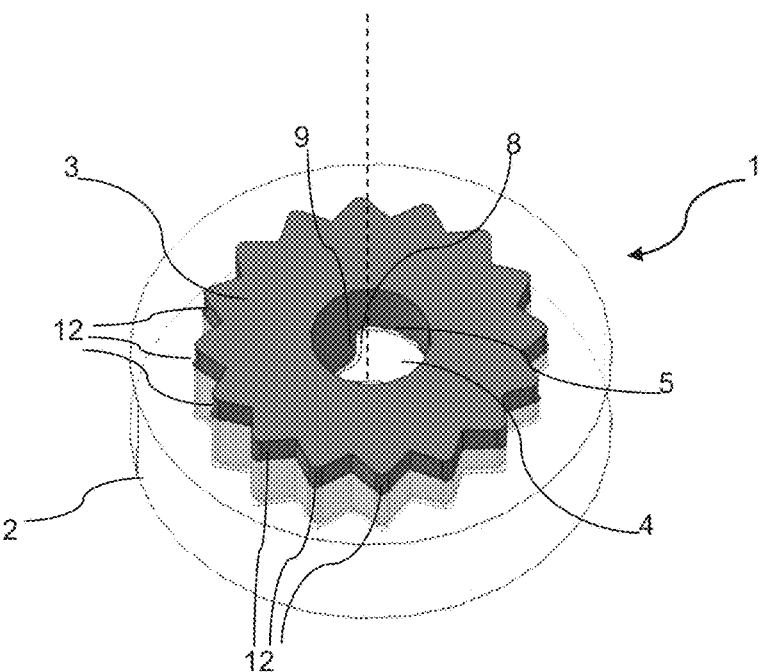
FIG. 1 is a perspective view of a washer device constructed according to the invention in an assembled state.
Figure 2:
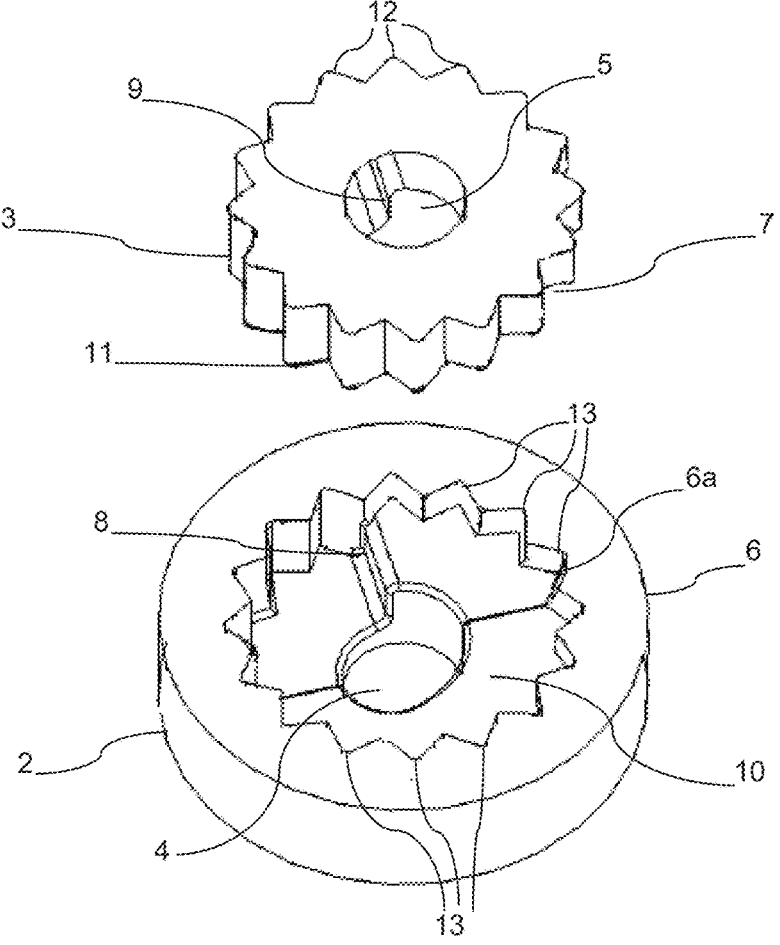
FIG. 2 is a perspective view the components of the washer device of FIG. 1.

With reference to FIGS. 1 and 2, a washer device constructed according to the invention is shown and generally indicated by the reference numeral 1. The washer device comprises two annular disk-like components 2, 3 that are preferably formed from a strong material, such as steel. In FIG. 1, the larger component 2 is shown in a translucent form so that the smaller component 3 can be seen. The components 2, 3 have different maximum diameters. The first, larger, component 2 has the shape of a cup, with a recess (6a of FIG. 2) arranged to accommodate the second, smaller, component 3. When the components 2, 3 are brought together, the second component 3 sits in the recess 6a and is nested in the first component 1. The components 2, 3 are arranged to fit together such that the central aperture 4 of the first annular component 2 is coaxial with the central aperture 5 of the second annular component 3, as is shown in FIG. 1. The two apertures 4, 5, form a central aperture or through-hole arranged, in use, to accommodate a fastener, as will be described later in the specification.

Each component 2, 3 has a main face 6, 7 arranged to form a contact surface with the main face 7, 6 of the other component. A portion 6a of the main face of the larger component 2 is recessed to form a seat that is arranged to abut against the entirety of the main face 7 of the smaller component 3 when the smaller component is nested in the larger. Each main face 6, 7 includes a step 8, 9 that forms surface regions of different levels in a direction along the axis of the washer device 1. The step 8 of component 2 is formed in the recess 6a and is able to fit against the step 9 of the other component 3 in intimate contact. Each component 2, 3 further comprises a helical ramp 10, 11. In the smaller component 3, the helical ramp 11 extends around the circumference of its main face 7 from the top part of the step 9 to the bottom so that the component 3 has a thickness that differs around its circumference. In the larger component 2, the helical ramp 10 is formed in the recess 6a of the main face, so that the recess has a depth that differs around the circumference of the recess from the top part of the step 8 to the bottom.

The washer device 1 can have different effective thicknesses in dependence on the relative orientation of the smaller component 3 in the larger one 2. When the components 2, 3 are arranged with the step portions 8, 9 in intimate contact with each other, the washer device 1 is at its minimum effective thickness. If the smaller component 3 is rotated such that the portion of its face 7 in the region of maximum thickness engages with the recess 6a of the other component in the region of its minimum depth, then the washer device 1 assumes a position of maximum effective thickness.

In accordance with the invention, there is provided at least one projection, extending in a radial direction, on one component. The radially extending projection is arranged to be engageable with a corresponding radial recess or notch on the other component. In the embodiment of FIGS. 1 and 2, the smaller component 3 is provided with a plurality of uniform triangular tooth-like radial projections 12 that extend outwardly from the main body of the component 3, beyond its circumference, so that the smaller component resembles a cogwheel. Each projection 12 also extends axially for the thickness of the component 3 at that point.

The larger component 2 has corresponding uniform notches 13 that correspond to the shape of the tooth-like projections 12 of the smaller component 3. The notches 13 are formed radially in the inwardly-facing side wall, inside the recessed part 6a of the larger component 2. Each notch 13 extends in an axial direction for the depth of the recess 6a at that point. Thus the smaller component 3 can occupy a plurality of different predetermined angular positions with respect to the larger component 2, and each one corresponds to a different overall effective thickness of the washer device 1.

The co-operation of the projections 12 and the notches 13 prevents relative rotational movement of the washer components 2, 3 so that an operator can be certain that the components will not move out of their position corresponding to a desired effective thickness of the washer device 1. The co-operation of the projections 12 and notches 13 also prevents relative radial motion of the components 2, 3, so that they are always aligned coaxially and are able to accept a fastener through their central apertures 4, 5. The smaller component 3 is nested securely in the cup formed by the larger component 2, so that the smaller component is held in place both axially and radially.

Figures 3A, 3B, 3C, 3D:
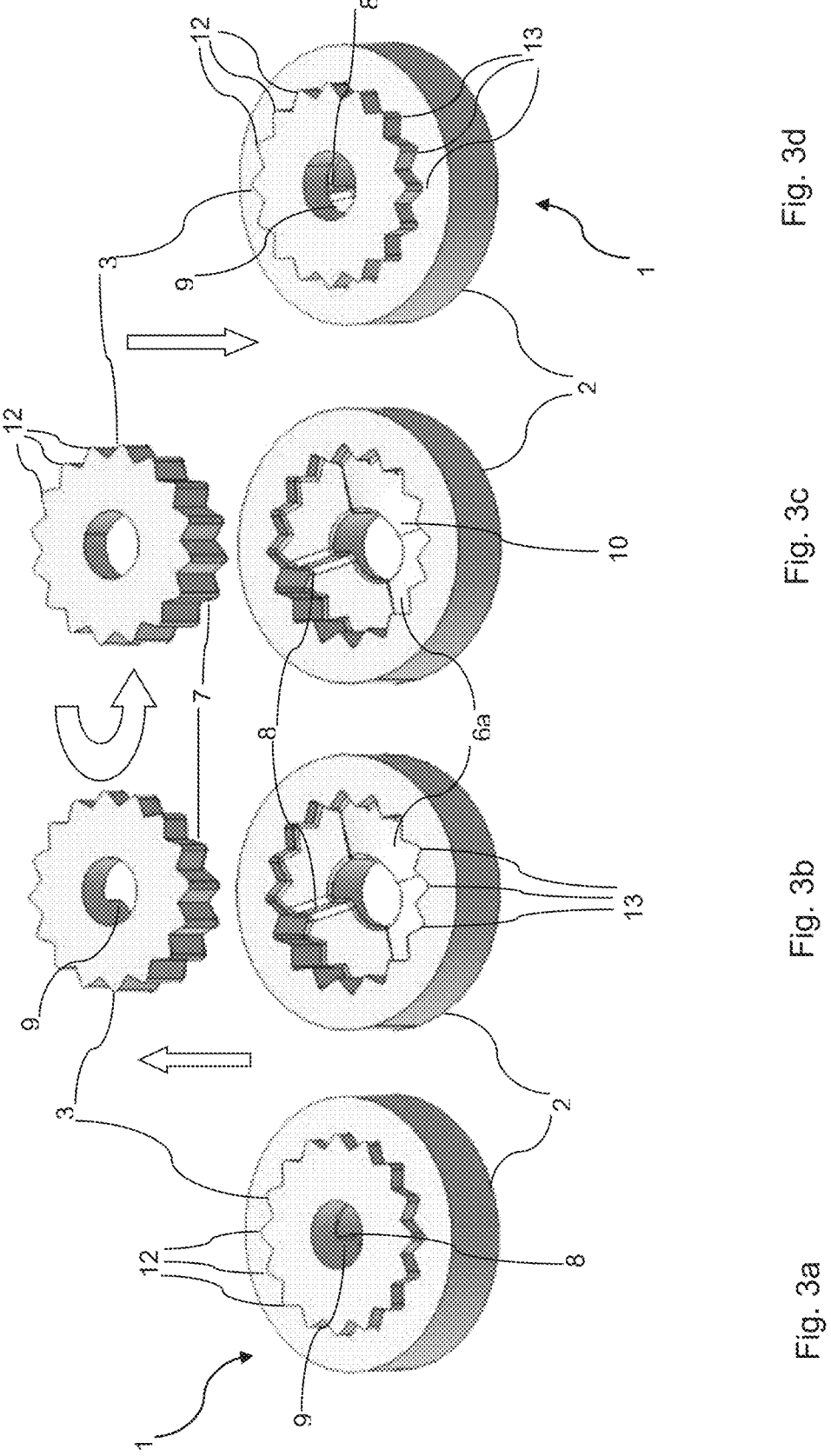
FIGS. 3a, 3b, 3c and 3d are perspective views showing a sequence of relative positions of the components of the washer device of FIG. 1 when adjusting from a first position corresponding to a first effective thickness to a second position corresponding to a second effective thickness.

FIGS. 3a to 3d show a sequence of adjusting the washer device 1. In the position of FIG. 3a, the washer device 1 is at the smallest effective thickness, with the smaller component 3 nested within the larger component 2, and the stepped portions 8, 9 of the components 2, 3 in intimate contact. If it is decided that the washer device 1 needs to be of a larger effective thickness, an operator simply separates the components axially by, for example, lifting the smaller component 3 out of the recess 6a of the larger component 2 (FIG. 3b). The operator then rotates the smaller component 3 anticlockwise about its axis so that the stepped portions 8, 9 are separated from each other. By doing this, the thickest part of the smaller component's ramp 11 is brought further up the larger component's helical ramp 10. In this example (FIG. 3c), the smaller component 3 is rotated anticlockwise by 45°. Of course, the operator could achieve this change of relative orientation of the components 2, 3 by rotating the larger component 2 clockwise. The smaller component 3 is then brought down into its new position (FIG. 3d) so that its main face 7 sits once more within the recess 6*a* of the other component 2 and the projections 12 sit in the notches 13. This new position corresponds to a larger effective thickness of the washer device 1.

Figures 4A, 4B, 5A, 5B:
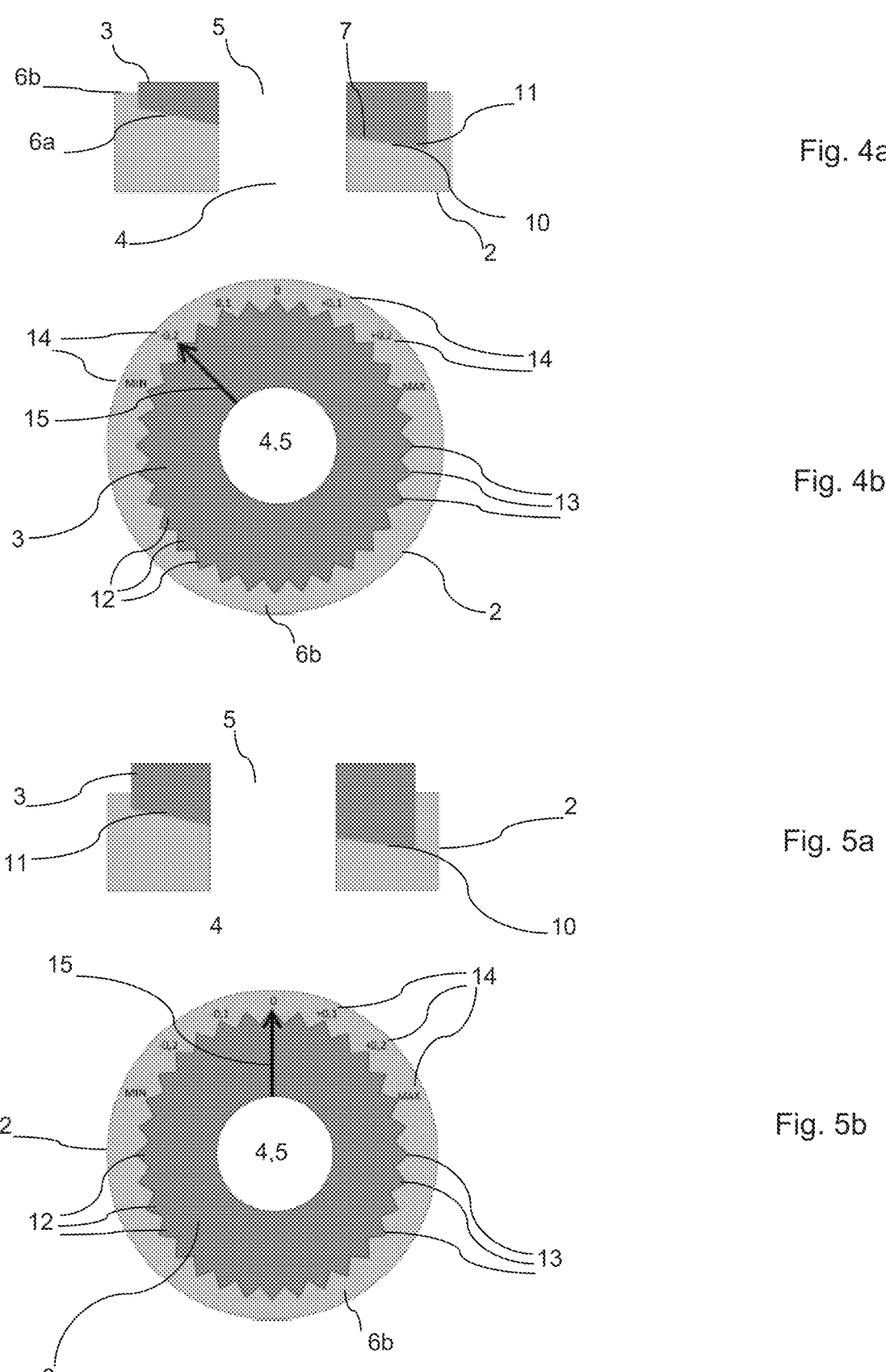
FIG. 4a is a sectional view of a washer device of the present invention in a first position.
FIG. 4b is a plan view of the washer device in the first position.
FIG. 5a is a sectional view of the washer device in a second position.
FIG. 5b is a plan view of the washer device in the second position.
Figures 6A, 6B:
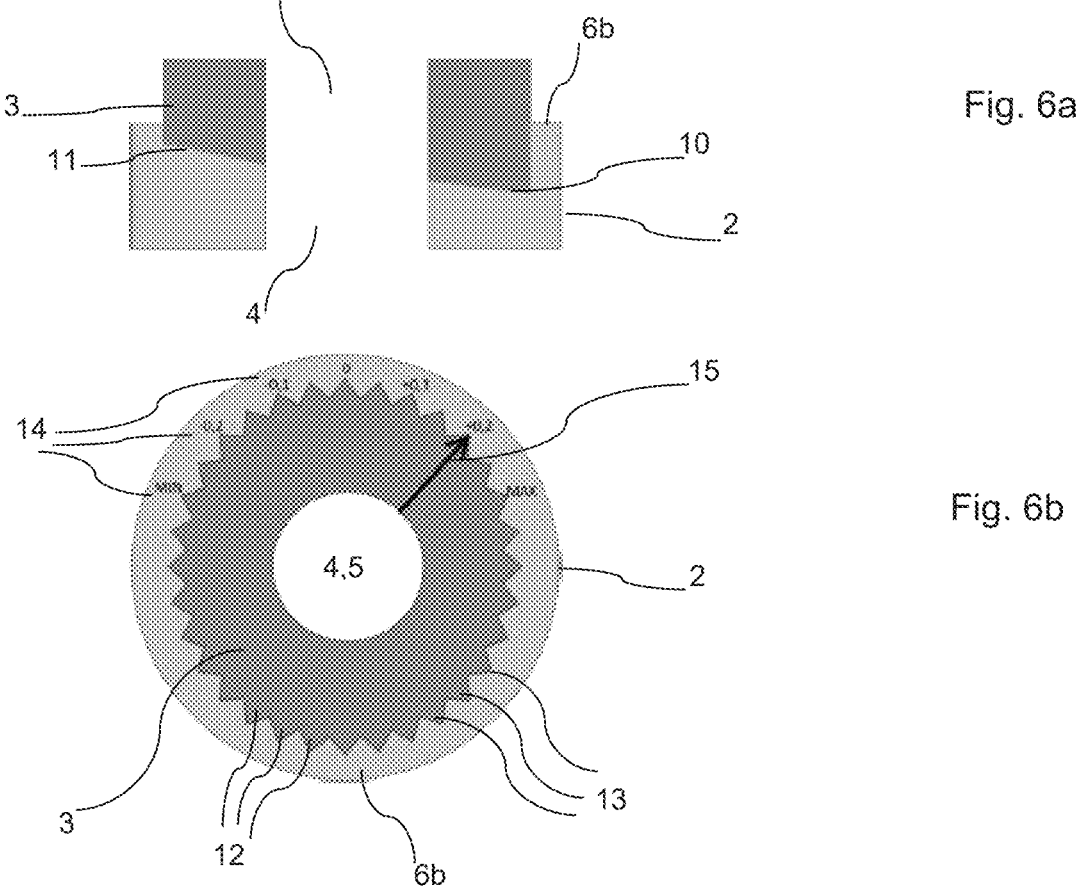
FIG. 6a is a sectional view of the washer device in a third position.
FIG. 6b is a plan view of the washer device in the third position.

FIGS. 4*a*, 4*b*, 5*a*, 5*b* and 6*a*, 6*b* show an embodiment of the washer device in three different positions, in sectional view (FIGS. 4*a*, 5*a*, 6*a*) and plan view (FIGS. 4*b*, 5*b*, 6*b*). In this embodiment, the stepped portions 8, 9 and helical ramps 10, 11 of the components 2, 3 are formed as a mirror image of the steps and ramps shown in FIGS. 1 to 3, so that clockwise relative rotation of the smaller component 3 with respect to the larger component 2 causes an increase in the effective thickness of the washer device 1.

In this embodiment, the edge region 6*b* of the main face 6 forming the uppermost surface of the larger component 2 has markings 14 that indicate the effective thickness of the washer device 1. The smaller component 3 is marked (by, for example, printing or etching) with a radially-projecting arrow 15 on its uppermost surface. Of course, the arrow 15 could be printed or etched onto the edge region 6*b* of the larger component 2, with the thickness markings 14 printed or etched onto the uppermost surface of the smaller component 3. When the smaller component 3 is nested in the larger component 2 in an assembled position, the arrow 15 points to a marking 14 indicative of the effective thickness of the washer device 1 in that position. The position shown in FIGS. 4*a* and 4*b* represents the second smallest effective thickness of the washer device 1, with the stepped portions 8, 9, slightly separated and the helical ramps 10, 11 shifted in relative position so that the ramp 11 is a small way up the ramp 10 in an axial direction. The position corresponding to the smallest effective thickness (such as that shown in FIG. 3*a*) is marked as "MIN" (for "minimum") on the uppermost surface of the edge region 6*b* of the larger component's main face.

FIGS. 5*a* and 5*b* show the washer device 1 in a second position, with the arrow 15 pointing to a middle position, marked as "0". This position represents a mean effective thickness of the washer device 1. It is anticipated that the washer devices would be supplied to the operator pre-assembled in this position, so that the operator can make a judgment as to whether a thicker or thinner washer is required for each gap, and then adjust the effective thickness of the washer device accordingly. The markings 14 show positive and negative values of the effective washer thickness relative to the mean position. In this position, the stepped portions 8, 9, are separated by approximately 90° and the ramp 11 is part-way up the ramp 10.

In FIGS. 6*a* and 6*b*, the washer device 1 is shown in a third position that corresponds to its second largest effective thickness. In this position, the ramp 11 is quite a long way up the ramp 10 in the axial direction and the stepped portions 8, 9 are close to being diametrically opposite one another. The position marked as "MAX" (for "maximum") on the uppermost surface of the edge region 6*b* of the larger component's main face need not correspond to the largest obtainable effective thickness of the washer device, but could instead indicate a position corresponding to a minimum bearing area of the contact surfaces of the components required to maintain a threshold mechanical strength of the washer device 1.

Figure 7:
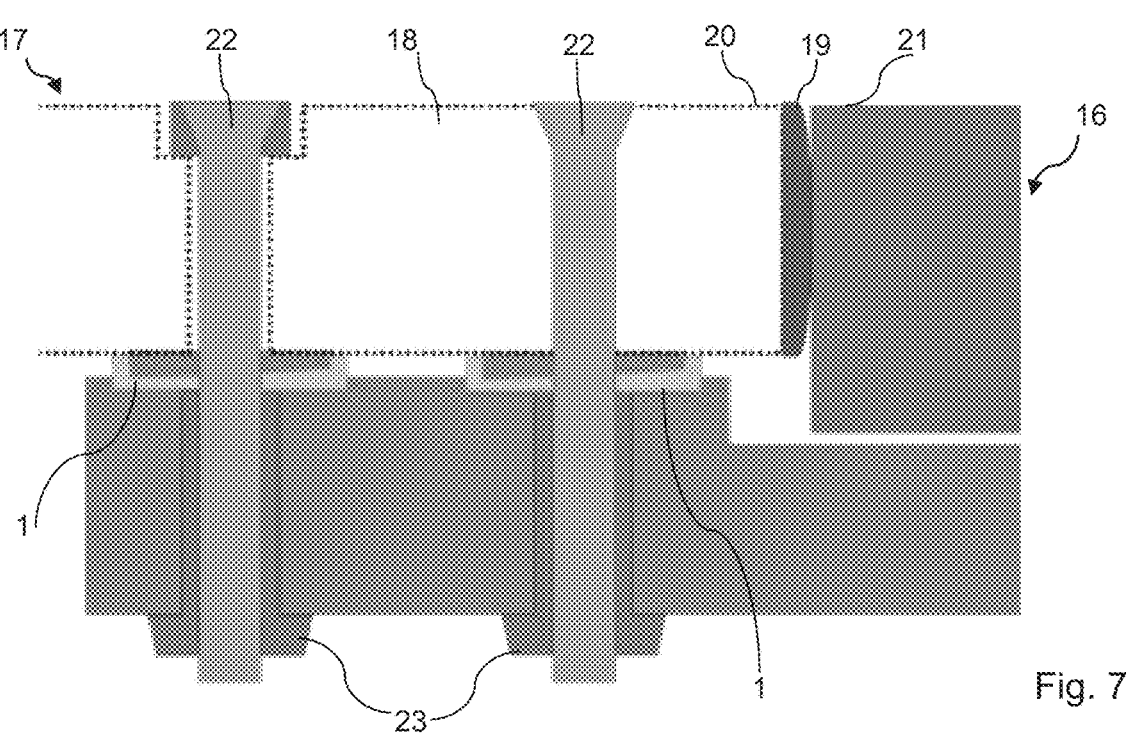
FIG. 7 is a sectional view of an aircraft component assembly including washer devices constructed according to the invention.

FIG. 7 is a simplified view of an aircraft component assembly incorporating washer devices 1 of the present invention. A fixed leading edge (FLE) assembly is shown schematically and indicated generally by the reference numeral 16. The FLE assembly 16 is located on the front of an aircraft's wing. The FLE houses numerous control systems for the aircraft. A leading edge (LE) module, indicated generally by the reference numeral 17, is provided in the form of a deployable LE device, such as a slat. In FIG. 7, the slat itself is not illustrated: only the primary link 18 that is used as an attachment point to the FLE 16, and a seal 19 that is arranged to abut the FLE are shown. The LE module 17 can be assembled as a single component assembly off-line; then it is brought up to the FLE 16 and attached in a single operation. Preferably this is done as an automated operation.

A key challenge in the attachment of these kinds of modules is the adjustment of the outer aerodynamic surface of each subassembly (known as the outer mold line, or OML) in order to minimize steps and gaps between the components, and therefore aerodynamic drag in the completed wing assembly. For example, in the apparatus shown in FIG. 7, a gap or step could occur between the OML 20 of the LE module 17 and the OML 21 of the FLE 16. To this end, several washer devices 1 constructed according to the invention are provided between the LE module 17 and the FLE 16. An operator can adjust the effective thickness of each washer device 1 as hereinbefore described in order to reduce or even eliminate any discontinuities between the OMLs 20, 21. Fasteners in the form of bolts 22 are inserted through the central apertures 4, 5 and high load captive nuts 23 are introduced; together the bolts and nuts to attach the LE module 17 to the FLE 16.

Figure 8:
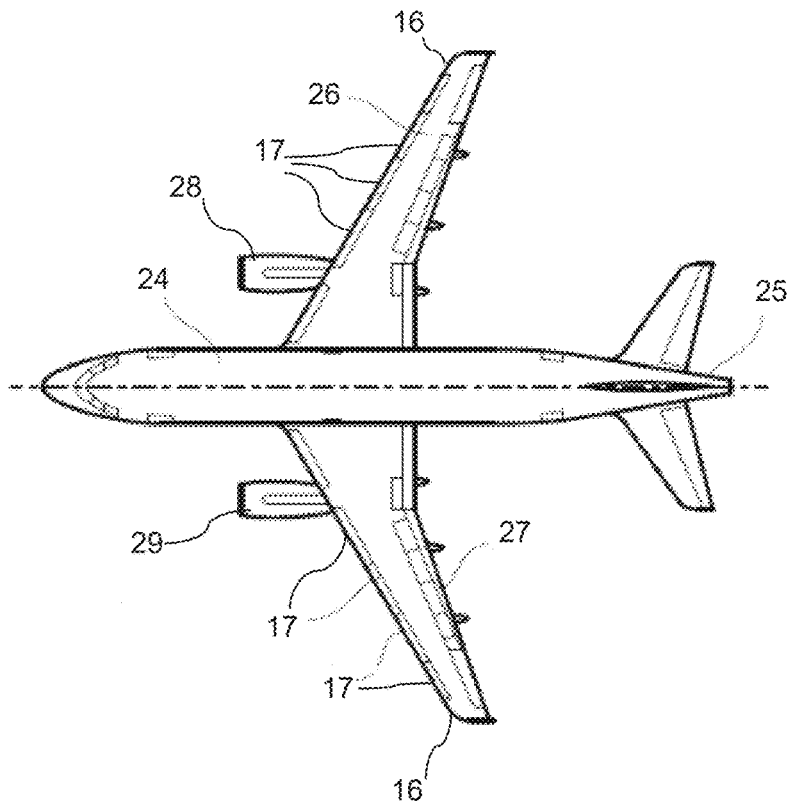
FIG. 8 is a plan view of an aircraft including the aircraft component assembly of FIG. 7.

FIG. 8 is a plan view of an aircraft including the component assembly of FIG. 7. The aircraft comprises a fuselage 24; tail 25; and two wings 26, 27, each having and engine 28, 29 respectively attached to it. Each wing 26, 27 includes a fixed leading edge 16 and a plurality of leading edge modules 17, each of which comprises a slat. Slats are aerodynamically shaped panels that extend from the FLE 16 and can be deployed so as to deflect downwardly from it. The slats produce a higher coefficient of lift; by deploying the slats an airplane can fly at lower speed. This is highly useful at landing and especially take off where it is desired to gain altitude quickly. In cruise flight the slats are retracted.

Of course, the washer devices 1 of the present invention could be deployed on any other part of the aircraft where a tolerance stack is likely at a joint between components or subassemblies, in order to reduce or prevent discontinuities.

Further variations may be made without departing from the scope of the invention. For example, the components 2, 3 of the washer device may be made from permanently magnetic material and are so magnetically polarized that the two components automatically come together in the assembly direction when they are brought close to each other. Alternatively, only one of the components may be made of permanently magnetic material, in which case the other component may include a ferromagnetic material, such as iron. This feature assists the user in assembling the washer device 1 and is of particular benefit in situations where the washer device is not in a horizontal position in situ.

The minimum and maximum effective thicknesses may be governed by the gradient and arc angle of the helical ramps 10, 11. Improved mechanical properties could be achieved by maximising the arc angle of the helical ramps.

A plurality of radial projections and notches are shown in the drawings, but other arrangements will be apparent to the skilled person. For example, only one radial projection 12 may be provided on one component, able to fit into a plurality of notches 13 on the other component, with each relative angular position of the components corresponding to a different effective thickness of the washer device. Alternatively, a plurality of radial projections 12 may be provided on one component and arranged to fit into a single notch 13 on the other component, with each relative angular position of the components corresponding to a different effective thickness of the washer device. The projection or projections may be arranged as radially inwardly projecting on the larger component 2, with the smaller component having one or more corresponding radially inwardly projecting notches.

A plurality of projections 12 and notches 13 is preferred for aircraft assembly applications as this arrangement increases the stability of the washer device. A mix of projections 12 and notches 13 may be provided on each component 2, 3: in fact, the embodiments shown in the drawings could be viewed as a series of alternating triangular projections and notches on one component arranged to engage with similarly alternating triangular notches and projections on the other component.

In the embodiments shown in the drawings, the projections 12 are shown as triangular teeth, but of course the radial projections could take other forms such as castellations, sawtooth shapes, or sinuous or cycloidal curves, with the notches taking corresponding forms. The surface regions of different levels along an axis of each component have been shown in the drawings as helical ramps, but could instead be realized by a series of discrete steps. Alternatively, the stepped portions 8, 9, could be omitted and the surface regions of different levels could be realized solely by helically ascending and descending ramps on each component. Further variations will be apparent to the skilled person.

The invention claimed is:

1. A washer device, comprising:
two annular components, each having a main face arranged to contact the main face of the other component, each main face having surface regions of different levels along an axis of the component, whereby relative rotation of one component with respect to the other about their common axis alters the effective thickness of the washer device;
at least one projection extending radially from one of the annular components and arranged to engage with at least one corresponding notch on the other annular component such that the annular components may be oriented in relative predetermined angular positions corresponding to different predetermined effective thicknesses of the washer device; and,
wherein the at least one projection is a plurality of radial projections extending outwardly from an outermost periphery of one component arranged to engage with a same number of corresponding notches on the other component.

2. A washer device as claimed in claim 1, in which the surface regions of different levels of each main face are formed by at least one step.

3. A washer device as claimed in claim 1, wherein the surface regions of different levels of each main face are formed by at least one ramp.

4. A washer device as claimed in claim 1, wherein one component is arranged to sit in a recess on the other component, the components having a coaxial central aperture.

5. A washer device as claimed in claim 1, further comprising a plurality of notches on one component with which the radial projection of the other component can engage.

6. A washer device as claimed claim 1, wherein at least one component includes permanently magnetic material.

7. A washer device as claimed in claim 1, further comprising visual indicators arranged to indicate to a user the effective thickness of the washer device when the components are in different respective relative positions.

8. An aircraft component assembly including a washer device as claimed in claim 1.

9. An aircraft component assembly as claimed in claim 8, further comprising a fastener extending coaxially through the washer device.

10. An aircraft including an aircraft component assembly as claimed in claim 8.

11. A method of assembling aircraft components comprising the step of adjusting the effective thickness of the washer device as claimed in claim 1.

12. A method as claimed in claim 11, in which the step of adjusting the effective thickness of the washer device further comprises the steps of separating axially the components of the washer device, rotating one component with respect to the other about the axis and then axially bringing the components together.

13. A washer device, comprising:
two annular components, each having a main face arranged to contact the main face of the other component, each main face having surface regions of different levels along an axis of the component, whereby relative rotation of one component with respect to the other about their common axis alters the effective thickness of the washer device;
at least one projection extending radially from an outermost periphery of one of the annular components and arranged to engage with at least one corresponding notch on the other annular component such that the annular components may be oriented in relative predetermined angular positions corresponding to different predetermined effective thicknesses of the washer device;
wherein the at least one projection is a plurality of radial projections extending outwardly from an outermost periphery of one component arranged to engage with a same number of corresponding notches on the other component; and
wherein the surface regions of different levels of each main face are formed by a helical ramp extending around the circumference of its main face from a higher thickness region to a lower thickness region, and wherein the helical ramps of the two annular components cooperatively engage to adjust the effective thickness of the washer device through relative rotation.

14. A washer device, comprising:
two annular components, each having a main face arranged to contact the main face of the other component, each main face having surface regions of different levels along an axis of the component, whereby relative rotation of one component with respect to the other about their common axis alters the effective thickness of the washer device;
at least one projection extending radially from an outermost periphery of one of the annular components and arranged to engage with at least one corresponding notch on the other annular component such that the annular components may be oriented in relative predetermined angular positions corresponding to different predetermined effective thicknesses of the washer device;
wherein the at least one projection is a plurality of radial projections extending outwardly from an outermost periphery of one component arranged to engage with a same number of corresponding notches on the other component;

wherein the surface regions of different levels of each main face comprise both at least one step and at least one helical ramp forming a gradual transition between different levels; and, wherein the at least one step and the at least one helical ramp of one component are arranged to cooperatively engage with corresponding at least one step and at least one helical ramp of the other component to provide thickness adjustments through relative rotation of the components.

\* \* \* \* \*